United States Patent [19]

Smith

[11] Patent Number: 5,772,304
[45] Date of Patent: Jun. 30, 1998

[54] OPTICAL FIBER-TO-PLANAR LIGHTPIPE GROOVED OPTICAL COUPLER

[75] Inventor: Ronald T. Smith, Corona Del Mar, Calif.

[73] Assignee: Raytheon Company, Lexington, Mass.

[21] Appl. No.: 720,657

[22] Filed: Oct. 2, 1996

[51] Int. Cl.$^6$ ........................................................ F21V 8/00
[52] U.S. Cl. ................................ 362/31; 362/32; 362/80.1
[58] Field of Search .................................. 362/26, 31, 32, 362/61, 80, 80.1

[56] References Cited

U.S. PATENT DOCUMENTS

| | | | |
|---|---|---|---|
| 5,369,554 | 11/1994 | Erion | 362/31 |
| 5,558,420 | 9/1996 | Oki et al. | 362/31 |
| 5,669,693 | 9/1997 | Smith | 362/31 |

*Primary Examiner*—Stephen F. Husar
*Attorney, Agent, or Firm*—Leonard A. Alkov; Glenn H. Lenzen, Jr.

[57] ABSTRACT

A rear exterior lamp for a vehicle including an optical fiber (61) for providing an optical fiber light output, an optical coupler (50) responsive to the optical fiber light output for providing an optical coupler light output, and a light panel (11, 13, 15, 100) responsive to the optical coupler light output for providing an exterior lamp output. The optical coupler more particularly includes a transparent substrate having an input side (53) for receiving the optical fiber light output, an output surface (51), and a plurality of internally reflecting surfaces (55a) opposite the output surface for internally reflecting light that enters the input surface toward the output surface.

5 Claims, 2 Drawing Sheets

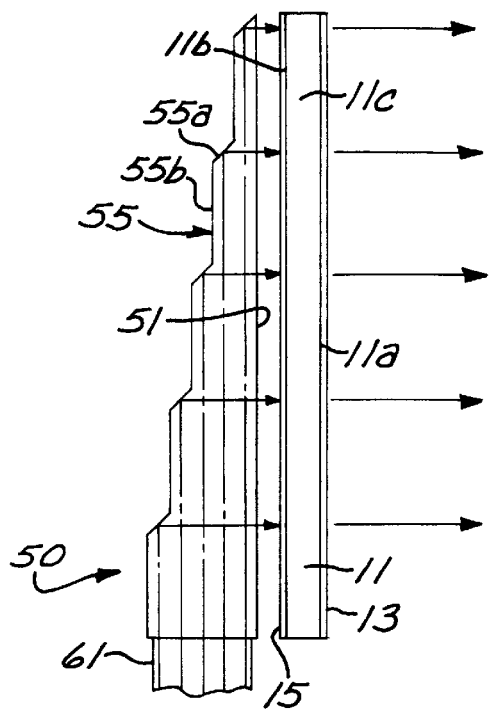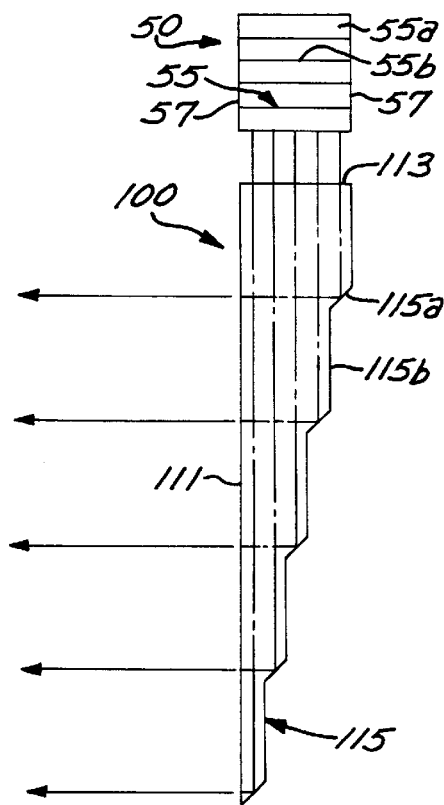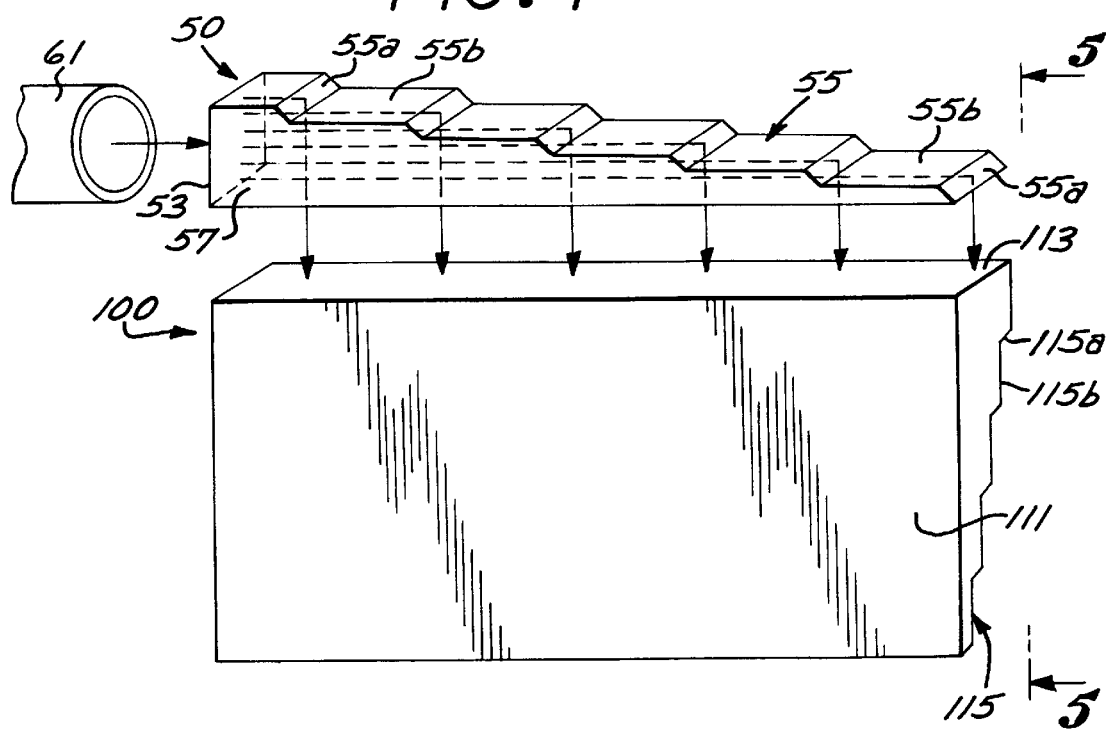

OPTICAL FIBER-TO-PLANAR LIGHTPIPE GROOVED OPTICAL COUPLER

BACKGROUND OF THE INVENTION

The disclosed invention is directed generally to a rear exterior lamp structure for a vehicle, and more particularly to a thin rear exterior lamp structure having a remotely located light source.

Vehicles such as automobiles are required to have rear exterior lamps that function as rear lights, stop lights and turn signal lights. Taillamps are conventionally comprised of an incandescent bulb, a reflector, a colored lens, and a housing.

Considerations with conventional rear exterior vehicle lamps include size, weight, complexity, and the need to configure the rear structure of a vehicle to accommodate the thickness of the rear exterior lamp. Another consideration with conventional rear exterior lamps is the use of a light bulb adjacent the light emitting elements.

SUMMARY OF THE INVENTION

It would therefore be an advantage to provide a thin rear exterior lamp for a vehicle.

Another advantage would be to provide a rear exterior lamp having a remotely located light source.

The foregoing and other advantages are provided by the invention in a rear exterior lamp for a vehicle that includes an optical fiber for providing an optical fiber light output, an optical coupler responsive to the optical fiber light output for providing an optical coupler light output, and a light panel responsive to the optical coupler light output for providing an exterior lamp output. The optical coupler more particularly includes a transparent substrate having an input surface for receiving the optical fiber light output, an output surface, and a plurality of internally reflecting surfaces opposite the output surface for internally reflecting light that enters the input surface toward the output surface.

The light panel comprises, for example, a light pipe having first and second opposing surfaces, a rear exterior lamp hologram attached to one of the first and second opposing surfaces of the light pipe, a coupling hologram attached to one of the first and second opposing surfaces of the light pipe for coupling the optical coupler light output into the light pipe such that a portion of the optical coupler light output propagates by internal reflection within the light pipe.

As a further example, the light panel comprises a light transmissive substrate, an input surface formed on the substrate for receiving the optical coupler light output, an output surface formed on the substrate, and a plurality of internally reflecting surfaces formed on the substrate opposite the output surface for internally reflecting light that enters the substrate at the input surface toward the output surface.

BRIEF DESCRIPTION OF THE DRAWINGS

The advantages and features of the disclosed invention will readily be appreciated by persons skilled in the art from the following detailed description when read in conjunction with the drawing wherein:

FIG. 3 is a schematic plan view of the optical coupler of the rear exterior vehicle lamp of FIG. 1.

FIG. 4 is a schematic perspective view of a further rear exterior vehicle lamp in accordance with the invention.

FIG. 5 is a schematic elevational view of the light pipe of the rear exterior vehicle lamp of FIG. 4.

DETAILED DESCRIPTION OF THE DISCLOSURE

Figure 1:
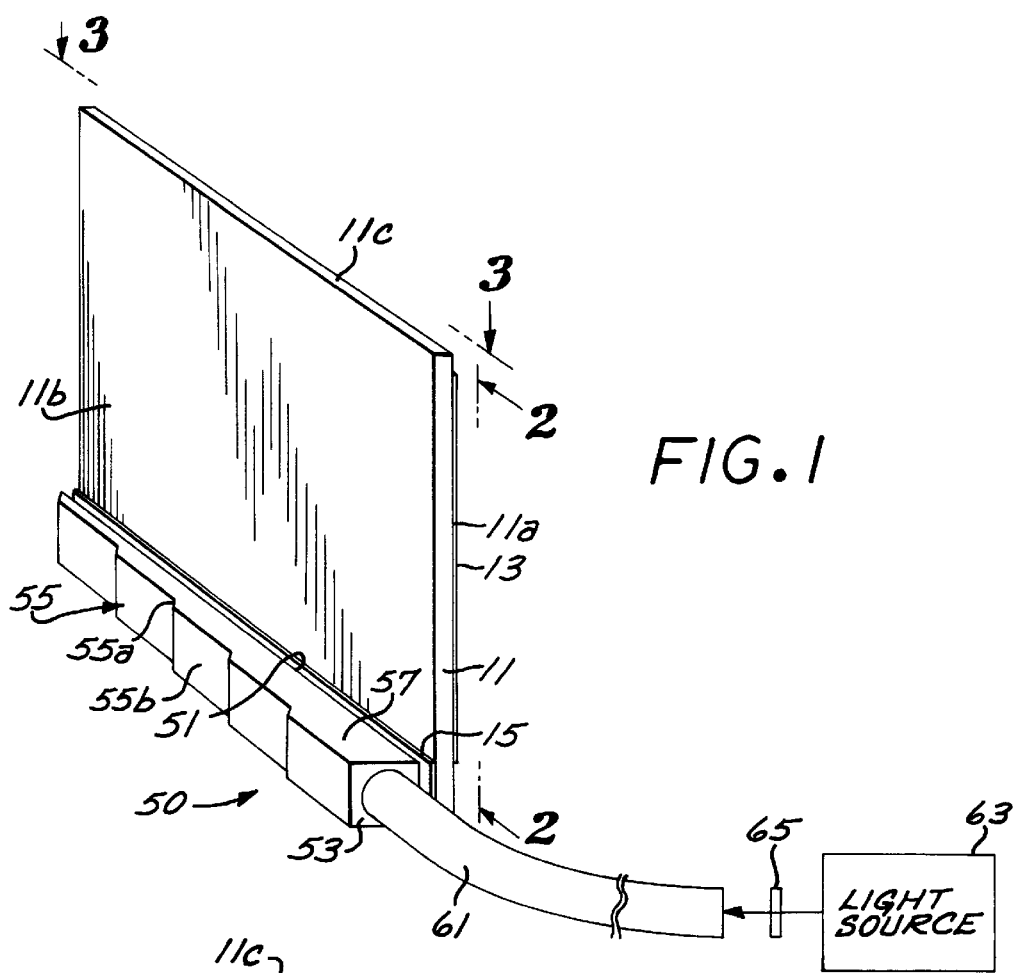
FIG. 1 is a schematic perspective view of a rear exterior vehicle lamp in accordance with the invention.

In the following detailed description and in the several figures of the drawing, like elements are identified with like reference numerals.

Figure 2:
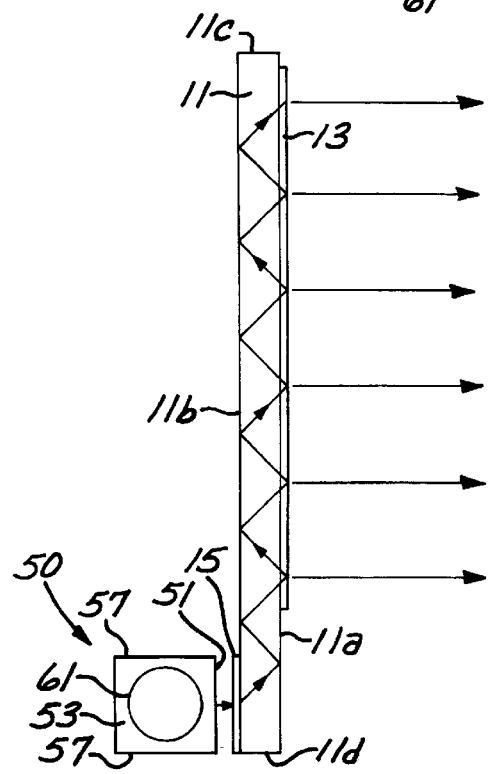
FIG. 2 is a schematic side elevational view of the rear exterior vehicle lamp of FIG. 1.

Referring now to FIGS. 1 and 2, schematically set forth therein are a perspective view and side elevational view of a holographic rear exterior vehicle lamp in accordance with the invention. The holographic rear exterior lamp includes a thin, flat transparent light pipe 11 having a first planar surface 11a and a second planar surface 11b that is opposite and parallel to the first planar surface 11a. A narrow top surface 11c extends between adjacent top edges of the first planar surface 11a and the second planar surface 11b, while a narrow bottom surface lid extends between adjacent bottom edges of the first planar surface 11a and the second planar surface 11b.

A rear exterior lamp hologram 13 is laminarly attached in an index matching manner to the first planar surface 11a adjacent the narrow top surface 11c of the light pipe 11, and extends downwardly, for example past the vertical center between the narrow top surface 11c of the light pipe 11 and the narrow bottom surface 11d of the light pipe 11.

The holographic rear exterior lamp further includes an input coupling volume transmission hologram 15 that is laminarly attached in an index matching manner to the second planar surface 11b adjacent the lower edge of the light pipe 11. The input coupling hologram 15 is illuminated with a reconstruction beam that is provided by the output of a tapered optical coupler 50.

The input coupling hologram 15 diffracts the reconstruction illumination incident thereon into the light pipe 11 at an upwardly directed angle that is appropriate for total internal reflection within the light pipe 11 and the hologram 13, such that a portion of the light that is diffracted by the input coupling hologram 15 propagates upwardly within the light pipe 11 and the hologram 13. The rear exterior lamp hologram 33 diffracts a portion of the trapped light as rear exterior illumination, whereby the light pipe 31, the input coupling hologram 35, and the rear exterior lamp hologram 33 function as a light panel that provides rear exterior illumination in response to light that is communicated via the optical fiber 61 and the optical coupler 50.

As more particularly shown in FIG. 3, the tapered optical coupler 50 comprises a generally elongated substantially transparent substrate having an elongated planar output surface 51, an input side 53 for coupling light from an optical fiber 61 into the optical coupler 50, and an internally reflecting side 55 opposite the output surface 51 for reflecting toward the output surface 51 a portion of the light injected into the coupler 50 at the input side 53. The input side 53 can include a small indentation for assisting in the alignment of the end of the optical fiber 61 relative to the input side 53. The optical coupler 50 further includes opposing parallel sides 57 that extend from the longitudinal edges of the output surface 51 to the internally reflecting side 55. For example, the opposing parallel sides 57 are orthogonal to the output surface 51.

The optical fiber 61 more particularly transmits light from a remotely located light source 63 and color filter 65 that produce the desired color output of the rear exterior lamp.

By way of illustrative example, the light source 63 utilizes a high intensity discharge bulb and an ellipsoidally shaped dichroic mirror which focuses visible light from the bulb to a compact spot located at the entrance aperture of the optical fiber 61. The arc of the high intensity discharge bulb is located at one focus of the ellipsoid and the center of the entrance aperture of the optical fiber is located at the other focus of the ellipsoid. In this manner, most of the light from the high intensity discharge bulb that is reflected by the ellipsoidal reflector is injected into the optical fiber. The color filter 65 would be appropriately located in the path of the light that is focused onto the entrance aperture of the optical fiber 61.

The reflective side 55 of the optical coupler 50 more particularly includes a plurality of parallel internally reflecting surfaces 55a which are orthogonal to a plane that is parallel to the longitudinal extent of the planar output surface 51 and orthogonal to the planar output surface 51, and are angularly disposed to generally face the input side 53 and the output surface 51 so as to reflect toward the output surface 51 light that is injected into the optical coupler 50 by the optical fiber 61. The parallel internally reflecting surfaces 55a are spaced apart along the longitudinal extent of the output surface 51, and are at stepwise progressively closer distances to the output surface 51 with increasing distance from the input side 53. The internally reflecting surfaces 55a are separated by separation surfaces 55b that are parallel to the output surface 51, whereby the internally reflecting surfaces 55a are adjoining when viewed along the longitudinal extent of the output surface 51.

Effectively, the reflective side 55 of the optical coupler 50 comprises a stepped surface having (a) a series of internally reflecting surfaces 55a that are located at positions that are stepwise closer to the output surface 51 with distance from the input side 53, and (b) a series of separation surfaces 55b that are parallel to the output surface 51 and interconnect adjacent edges of adjacent internally reflecting surfaces 55a.

By way of illustrative example, the optical fiber 61 and the input side 53 are configured so that the optical axis of the injected light in the optical coupler is parallel to the longitudinal extent of the output surface 51, and the internally reflecting surfaces 55a are about a 45 degree angle relative to the output surface 51.

The output surface 51 of the light coupler 50 is separated by a gap from the input coupling hologram 15 so that injected light in the optical coupler 50 is trapped by total internal reflection within the light coupler 50 until portions of the injected light are reflected toward the output surface 51 by the internally reflecting surfaces 55a. The internally reflecting surfaces 55a preferably span the extent of the input side 53, such that almost all of the injected light is reflected to the output surface 51. The light reflected by the internally reflecting surfaces 55a is preferably incident at the output surface 51 at close to normal, and thus almost all of the injected light reflected by the internally reflecting surfaces 55a is efficiently transmitted by the output surface 51.

Referring now to FIGS. 4 and 5, schematically set forth therein are a rear perspective view and a side elevational view of a further rear exterior vehicle lamp in accordance with the invention. The rear exterior lamp includes a thin transparent tapered light pipe 100 having an output surface 111, an input surface 113 that is orthogonal to the output surface ill, and an internally reflecting side 115. An optical coupler 50 that is substantially identical to the optical coupler 50 of FIGS. 1, 2 and 3 injects light into the input surface 113 of the light pipe 100, and a portion of the injected light is internally reflected by the internally reflecting side 115 toward the output surface 111. The light reflected toward the output surface 111 is incident on the output surface 111 at close to normal, and is efficiently transmitted by the output surface 111 to provide rear exterior lamp illumination.

The output surface 51 of the light coupler 50 is separated by a gap from the input surface 113 of the light pipe 100 so as to confine the light injected into the optical coupler 50 by total internal reflection until portions of the injected light are reflected toward the output surface 51 by the internally reflecting surfaces 55a.

The internally reflecting side 115 of the light pipe 100 more particularly includes a plurality of parallel internally reflecting surfaces 115 for internally reflecting portions of the light injected into the light pipe 100 toward the output surface 111. The light pipe 100 thus functions as a light panel that provides rear exterior illumination in response to light that is communicated via the optical fiber 61 and the optical coupler 50.

The plurality of parallel internally reflecting surfaces 115a are orthogonal to a plane that is orthogonal to the planar output surface 111 and parallel to the optical axis of the injected light in the light pipe 100, and are angularly disposed to generally face the input surface 113 and the output surface 111 so as to reflect toward the output surface 111 light that is injected into the light pipe 100 by the optical coupler 50. The internally reflecting surfaces 115a are spaced apart along the extent of the optical axis of the injected light in the light pipe 100, and are at stepwise progressively closer distances to the output surface 111 with increasing distance from the input surface 113. The internally reflecting surfaces 115a are separated by separation surfaces 115b that are parallel to the output surface 111, whereby the internally reflecting surfaces 115a are adjoining when viewed along the optical axis of the injected light in the tapered light pipe 100. Effectively, the internally reflecting side 115 of the light pipe 100 comprises a stepped surface having a series of internally reflecting surfaces 115a that are located at positions that are stepwise closer to the output surface 111 with distance from the input surface 113, and a series of separation surfaces 115b that are parallel to the output surface 111 and interconnect adjacent edges of adjacent internally reflecting surfaces.

By way of illustrative example, the input surface 113 is orthogonal to the output surface ill, and the internally reflecting surfaces 55a are orthogonal to a plane that is orthogonal to both the input surface 113 and the output surface and are angularly disposed at about 45 degrees relative to the output surface 111.

The foregoing has thus been a disclosure of a rear exterior lamp that is thin, compact and of light weight, and which advantageously utilizes a remotely located light source.

Although the foregoing has been a description and illustration of specific embodiments of the invention, various modifications and changes thereto can be made by persons skilled in the art without departing from the scope and spirit of the invention as defined by the following claims.

What is claimed is:

1. An exterior vehicle lamp, comprising:
   an optical fiber for providing an optical fiber light output;
   an optical coupler responsive to the optical fiber light output for providing an optical coupler light output, said optical coupler comprised of a transparent substrate having an input side for receiving said optical fiber light output, an output surface and a plurality of internally reflecting surfaces opposite said output surface for internally reflecting light that enters said input surface toward said output surface; and a light panel responsive to the optical coupler light output for providing an exterior lamp output.

2. The exterior vehicle lamp of claim 1 wherein said plurality of internally reflecting surfaces are progressively closer to said output surface with distance from said input surface.

3. The exterior vehicle lamp of claim 2 wherein said plurality of spaced apart internally reflecting surfaces are separated by separation surfaces that are parallel to said output surface.

4. The exterior vehicle lamp of claim 1 wherein said light panel comprises:

a light pipe having first and second opposing surfaces;

a rear exterior lamp hologram attached to one of said first and second opposing surfaces of said light pipe;

holographic coupling means attached to one of said first and second opposing surfaces of said light pipe for coupling said optical coupler light output into said light pipe such that a portion of said optical coupler light output propagates by internal reflection within said light pipe.

5. The exterior vehicle lamp of claim 1 wherein said light panel comprises:

a light transmissive substrate;

an input surface formed on said substrate for receiving said optical coupler light output;

an output surface formed on said substrate;

a plurality of internally reflecting surfaces formed on said substrate opposite said output surface for internally reflecting light that enters said substrate at said input surface toward said output surface;

whereby a portion of the light that enters said substrate through said input surface is internally reflected toward said output surface and exits said output surface.

* * * * *